United States Patent
Pindi

(10) Patent No.: US 8,041,982 B2
(45) Date of Patent: Oct. 18, 2011

(54) REAL TIME CLOCK

(75) Inventor: Sanjeeva Reddy Pindi, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 421 days.

(21) Appl. No.: 12/395,326

(22) Filed: Feb. 27, 2009

(65) Prior Publication Data

US 2010/0220558 A1    Sep. 2, 2010

(51) Int. Cl.
*G06F 1/14* (2006.01)
(52) U.S. Cl. ............... 713/500; 327/160; 327/291
(58) Field of Classification Search ............... 327/100, 327/151, 160, 291, 296; 331/44, 60, 61; 713/400, 500–503, 600
See application file for complete search history.

(56) References Cited

U.S. PATENT DOCUMENTS

| 4,191,998 | A | * | 3/1980 | Carmody | 713/500 |
| 5,418,932 | A | * | 5/1995 | Watabe et al. | 713/500 |
| 7,093,144 | B2 | * | 8/2006 | Skroch | 713/300 |
| 7,962,773 | B2 | * | 6/2011 | Fernald et al. | 713/322 |

OTHER PUBLICATIONS

Texas Instruments Incorporated, Real-Time Clock (RTC), BQ32000 data sheet, Dec. 2008, www.ti.com, USA.

* cited by examiner

*Primary Examiner* — Glenn A Auve
(74) *Attorney, Agent, or Firm* — John J. Patti; Wade J. Brady, III; Frederick J. Telecky, Jr.

(57) ABSTRACT

Various apparatuses, methods and systems for a real time clock are disclosed herein. For example, some embodiments provide a real time clock including a clock generator having a first input connected to a clock signal and a second input connected to a time set signal. The clock generator produces a time change signal at an output of the clock generator. Counters, each adapted to track a different unit of time, are connected to the time change signal. The clock generator is adapted to generate a pulse on the time change signal for each pulse of the time set signal, and to generate separate pulses on the time change signal for consecutive pulses on the clock signal and the time set signal.

20 Claims, 6 Drawing Sheets

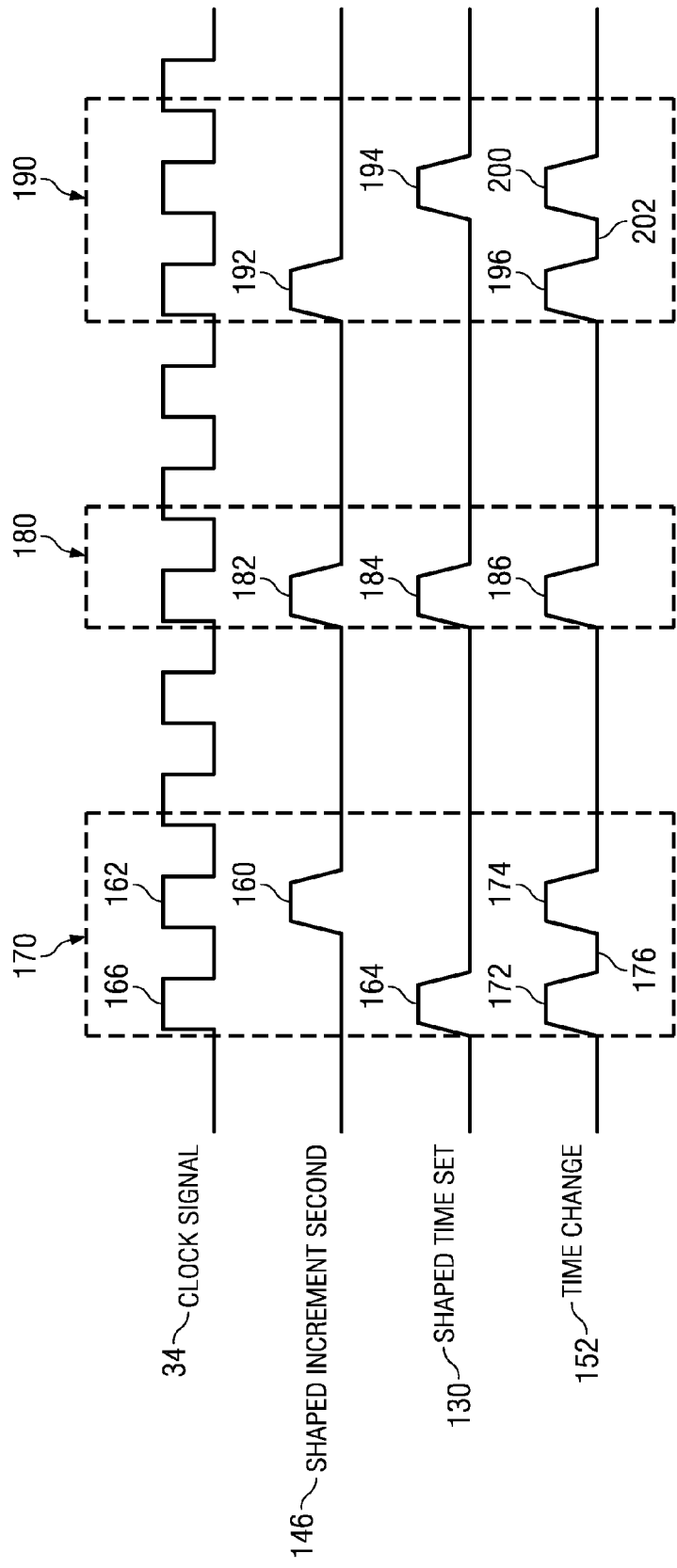

REAL TIME CLOCK

BACKGROUND

Electronic devices such as computers often include a real time clock circuit to keep track of a time and date. The time and date can then be used in a variety of important functions, including displaying the time and date to a user, time stamping operations performed by the electronic devices, etc. For example, when a data file is created or modified in a computer, a time and date stamp on the data file may be updated to identify when the change took place. When data is gathered by an electronic data collection system, a time and date stamp may be stored along with the data. Real time clock circuits may be used in a wide range of electronic devices for many different applications.

The time and date in a real time clock may often be manually or automatically set by an external source, such as a manual data entry by a user or by a connection to a time server on the Internet. Thereafter, the real time clock is generally expected to correctly keep track of the time and date, even if the electronic device is turned off and power is removed, so that the time and date are correct when the device is next powered on. A backup battery may therefore be connected to the real time clock to power the real time clock even when the host device containing the real time clock is turned off and power is removed. The life of a backup battery for a real time clock is particularly important because they are often relatively inaccessible in the host device and may not be user replaceable. For example, the backup battery for a real time clock in a computer is generally expected to last throughout the multi-year life of the computer. This requirement may be addressed to some extent by including a high capacity backup battery, although this increases the cost of the host device and may be less effective than desired if the real time clock uses power inefficiently while tracking the time and date when the host device is powered down.

SUMMARY

Various apparatuses, methods and systems for a real time clock are disclosed herein. For example, some embodiments provide a real time clock including a clock generator having a first input connected to a clock signal and a second input connected to a time set signal. The clock generator produces a time change signal at an output of the clock generator. Counters, each adapted to track a different unit of time, are connected to the time change signal. The clock generator is adapted to generate a pulse on the time change signal for each pulse of the time set signal, and to generate separate pulses on the time change signal for consecutive pulses on the clock signal and the time set signal.

In an embodiment of the real time clock the clock signal is adapted to pulse regularly, and a time value kept by the real time clock is updated when the clock generator pulses the time change signal in response to a pulse on the clock signal.

In an embodiment of the real time clock the time set signal is adapted to pulse when a time value kept by the real time clock is to be overwritten by a new time value from an external source.

In an embodiment the real time clock is adapted to operate in a normal mode and in a battery backup mode, and the clock generator is adapted to disregard the time set signal when the real time clock is operating in the battery backup mode.

In an embodiment of the real time clock the clock generator includes an input clock divider having an input connected to the clock signal and having an increment second signal at an output.

In an embodiment of the real time clock the input clock divider comprises a ripple counter having an input connected to the clock signal and a binary counter having an input connected to an output of the ripple counter.

In an embodiment of the real time clock the clock generator also includes a pulse widener having a data input connected to the time set signal and a clock input connected to the clock signal. The pulse widener is adapted to produce a widened time set signal having a pulse width that remains asserted for one cycle of the clock signal.

In an embodiment the clock signal to the pulse widener is gated in an AND gate. The AND gate has a non-inverted input connected to the clock signal and an inverted input connected to a battery backup mode signal. A gated clock for use in the pulse widener appears at an output of the AND gate.

In an embodiment of the real time clock the pulse widener includes a first flip flop having a clock input connected to the time set signal, a second flip flop having a clock input connected to the clock signal and a data input connected to an output of the first flip flop, and a third flip flop having a clock input connected to the clock signal and a data input connected to an output of the second flip flop. The widened time set signal appears at an output of the third flip flop and is connected to a clear input of the first flip flop and a clear input of the second flip flop.

In an embodiment of the real time clock the clock generator also includes a first pulse shaper connected to the increment second signal and an output with a pulse width that remains asserted for one half cycle of the clock signal. The clock generator also includes a second pulse shaper connected to the widened time set signal. The output of the second pulse shaper has an output with a pulse width that remains asserted for one half cycle of the clock signal. The clock generator also includes an OR gate with a first input connected to the output of the first pulse shaper, a second input connected to the output of the second pulse shaper, and an output carrying the time change signal.

In an embodiment of the real time clock the first pulse shaper includes a first flip flop having a data input connected to the increment second signal, and a clock input connected to the clock signal. A second flip flop in the first pulse shaper has a data input connected to the increment second signal, and a clock input connected to an inverted version of the clock signal. An AND gate in the first pulse shaper has an inverted input connected to an output of the first flip flop and a non-inverted input connected to an output of the second flip flop. The output of the first pulse shaper appears at an output of the AND gate.

In an embodiment of the real time clock the second pulse shaper includes a first flip flop having a data input connected to the widened time set signal, and a clock input connected to the clock signal. A second flip flop in the second pulse shaper has a data input connected to the widened time set signal, and a clock input connected to an inverted version of the clock signal. An AND gate in the second pulse shaper has an inverted input connected to an output of the first flip flop and a non-inverted input connected to an output of the second flip flop. The output of the second pulse shaper appears at an output of the AND gate.

In an embodiment of the real time clock a clock signal to the first pulse shaper and the second pulse shaper is gated in an AND gate. The AND gate has a non-inverted input connected to the clock signal and an inverted input connected to a battery backup mode signal. A gated clock for use in the first pulse shaper and the second pulse shaper appears at an output of the AND gate.

An embodiment of the real time clock also includes a multiplexer having a first input connected to the time change signal and a second input connected to the increment second signal. The multiplexer selects the time change signal when the real time clock is operating in a normal mode and the increment second signal when the real time clock is operating in a battery backup mode. The plurality of counters are connected to an output of the multiplexer.

Other embodiments provide a method of generating a real time clock, including combining a clock signal with a time set signal to form a time change signal that pulses for each pulse of the time set signal and that has separate pulses for consecutive pulses on the clock signal and the time set signal, and changing a value of the real time clock when the time change signal is pulsed.

An embodiment of a method of generating a real time clock includes dividing the clock signal to form an increment second signal and increasing a pulse width of the time set signal such that the time set signal has a pulse width that remains asserted for one cycle of the clock signal. The time change signal is based on the increment second signal and the time set signal.

An embodiment of a method of generating a real time clock includes narrowing a pulse width of the increment second signal and of the time set signal such that the increment second signal and the time set signal each have a pulse width that remains asserted for one half cycle of the clock signal.

An embodiment of a method of generating a real time clock includes disregarding the time set signal when operating in a battery backup mode.

An embodiment of a method of generating a real time clock includes disabling clocks used when combining the clock signal with the time set signal to form the time change signal when operating in the battery backup mode.

This summary provides only a general outline of some particular embodiments. Many other objects, features, advantages and other embodiments will become more fully apparent from the following detailed description, the appended claims and the accompanying drawings.

BRIEF DESCRIPTION OF THE DRAWINGS

A further understanding of the various embodiments may be realized by reference to the figures which are described in remaining portions of the specification. In the figures, like reference numerals may be used throughout several drawings to refer to similar components.

FIG. 6 depicts a timing diagram of signals in a real time clock in accordance with some embodiments.

FIG. 7 depicts a flow chart of a method of generating a real time clock in accordance with some embodiments.

DESCRIPTION

The drawings and description, in general, disclose various embodiments of a glitch free real time clock that operates in either a normal mode or a low power mode depending on the power source. A clock generator in the real time clock is used to generate pulses that drive counters that track various units of time the real time clock, such as seconds, minutes, hours, and days. During normal operation, the time can be updated or changed each time the clock generator provides a pulse, either to track time normally as it passes, or to set the time to a specified value from an external source. Thus, during normal operation the clock generator produces the pulses based both on an external clock signal and on an external write signal that is used to change the time. The real time clock may also operate in a low power mode, in which the clock generator produces the pulses based only on the external clock signal, thereby minimizing switching activity and conserving power.

For example, the real time clock may be installed in a computer. When the computer is turned on, the real time clock is powered by the main power source of the computer and operates in the normal mode. The clock generator in the real time clock generates a pulse each time the time is to be incremented or when the computer uses the external write signal to set the real time clock to a specific value. When the computer is turned off or is unplugged, the real time clock operates in the low power mode to extend the life of a backup battery powering the real time clock, basing the pulses only on the external clock signal and not on the external write signal. Generally, the low power mode is used when it does not affect the functionality of the real time clock, when the host device is not powered up and the external write signal is inactive.

Figure 1:
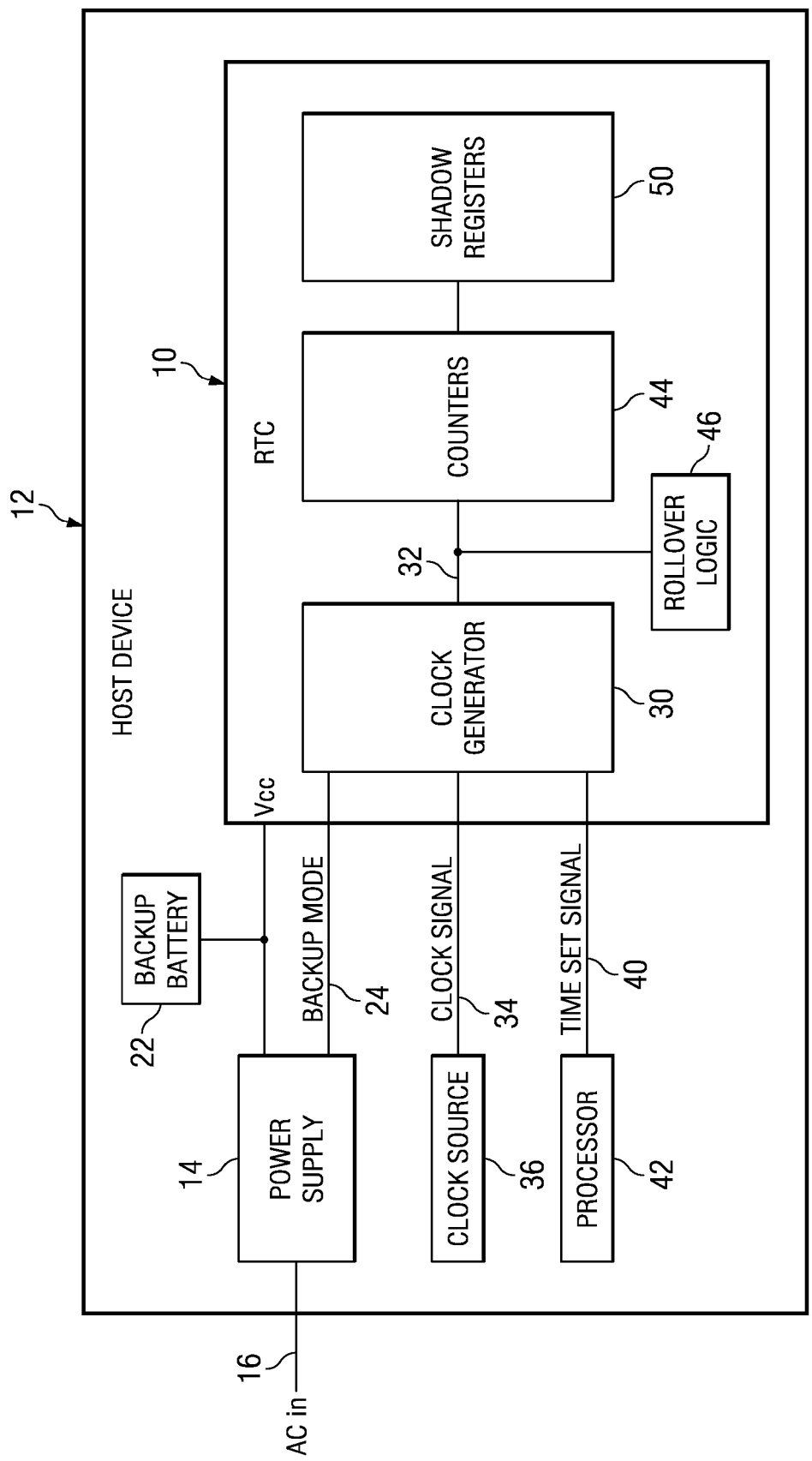
FIG. 1 depicts a block diagram of a real time clock in a host device in accordance with some embodiments.

Turning now to FIG. 1, an embodiment of a real time clock 10 in a host device 12 such as a computer will be described. The real time clock 10 is not limited to use in any particular host device or power supply configuration. However, in one example, the real time clock 10 may be powered by a power supply 14 in the host device 12, for example from an AC input 16, or by a backup battery 22. A backup mode signal 24 may be provided to the real time clock 10 to indicate whether to operate in normal mode or low power mode. In one example, the power supply 14 may assert the backup mode signal 24 when the host device 12 is powered on. In other embodiments, the real time clock 10 may automatically detect whether to operate in normal mode or low power mode. In one such embodiment, the power supply 14 and backup battery 22 are connected to the real time clock 10 at different terminals, and the real time clock 10 operates in normal mode when power is received at the terminal connected to the power supply 14.

A clock generator 30 in the real time clock 10 generates a clock signal 32 based on an external clock signal 34 from a clock source 36 and optionally on an external time set signal 40 from a processor 42 or any other device capable of writing a time value to the real time clock 10. The clock signal 32 is also referred to herein as a time change signal, as the value of the real time clock 10 is either incremented or overwritten when the time change signal 32 is asserted. The real time clock 10 tracks time in a number of counters 44, with a counter for each unit of time. Each of the counters 44 is clocked by the same time change signal 32, and the value in each of the counters 44 is incremented only when the appropriate increment condition is met as determined by rollover logic 46 in the real time clock 10. For example, given a time change signal 32 that pulses once per second, the seconds counter is incremented once for each pulse on the clock signal 32, the minutes counter is incremented once for each 60 pulses on the time change signal 32, etc. Using a single time change signal 32 for all of the counters 44 greatly simplifies the backend design of the real time clock 10, including placement of components and routing of electrically conductive traces between components, while guaranteeing that the counters 44 remain synchronized.

A snapshot of the time from the counters 44 is captured once per second in shadow registers 50. When the host device 12 reads the time from the real time clock 10, it is retrieved from the shadow registers 50 to avoid reading from the counters 44 as they are being changed. Setting the time in the real time clock 10 may be performed in the same fashion, by writing new time values to the shadow registers 50 which are then copied to the counters 44.

Figure 2:
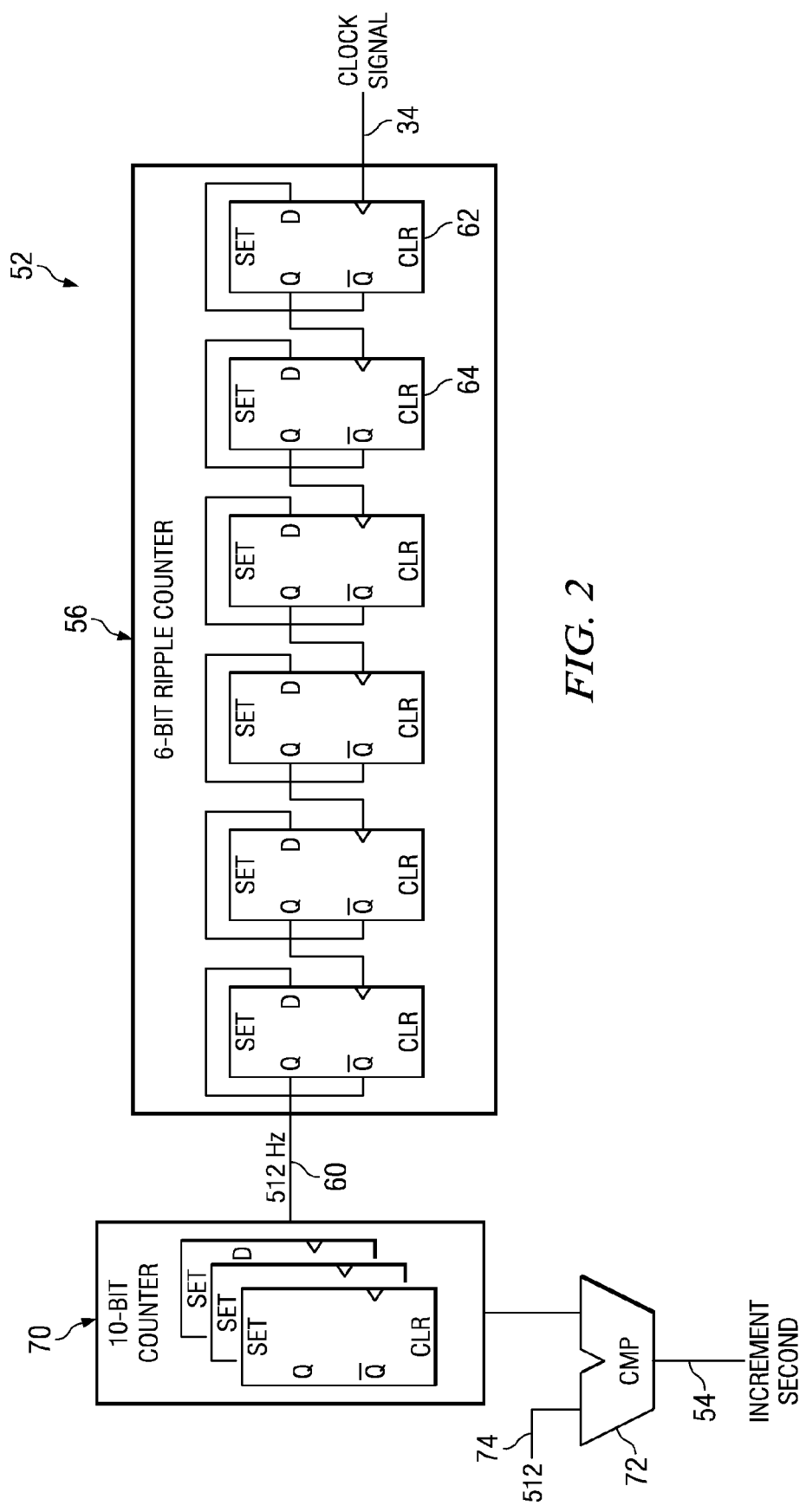
FIG. 2 depicts an input clock divider for a real time clock in accordance with some embodiments.

As illustrated in FIG. 2, an input clock divider 52 may be used in the real time clock 10 to divide the external clock signal 34 to a lower frequency clock for the counters 44. In this example, the external clock signal 34 is a 32 KHz clock that is divided to a 1 Hz clock, also referred to herein as an increment second signal 54. The real time clock 10 is not limited to a 1 Hz clock 54 for clocking the counters 44, nor to a 32 KHz external clock signal 34. In the embodiment illustrated in FIG. 2, the external clock signal 34 is divided by a 6-bit ripple counter 56 to produce a 512 Hz clock 60. The 6-bit ripple counter 56 is a low power device that minimally loads the external clock signal 34, with the first flip flop 62 in the 6-bit ripple counter 56 being the only device directly clocked by the external clock signal 34. Each successive flip flop (e.g., 64) is clocked by the data output of the previous flip flop (e.g., 62), dividing the clock by two in each of the six stages.

A 10-bit counter 70 counts pulses of the 512 Hz clock 60 to generate the increment second signal 54. A comparator 72 monitors the value in the 10-bit counter 70 and asserts the increment second signal 54 when it reaches a terminal count 74, typically 512 (or 511 when counting from 0), after which the 10-bit counter 70 start the count over. The 10-bit counter 70 and comparator 72 may also be used to calibrate the real time clock 10 by counting to a value 74 of 511 for a short second or 513 for a long second.

The increment second signal 54 may be used to clock the counters 44 in the real time clock 10, with the rollover logic 46 determining when each of the counters 44 should change values. The increment conditions for each of the counters 44 in one example of the real time clock 10 are listed below in Table 1, given a 32 KHz clock source 36.

TABLE 1

| Counter | Increment Condition |
| --- | --- |
| Seconds | Once every 64 * 512 clock cycles |
| Minutes | Once every 64 * 512 * 60 clock cycles |
| Hours | Once every 64 * 512 * 60 * 60 clock cycles |
| Day | Once every 64 * 512 * 60 * 60 * 24 clock cycles |
| Date | Once every 64 * 512 * 60 * 60 * 24 * 31 clock cycles |
| Month | Once every 64 * 512 * 60 * 60 * 24 * 31 clock cycles |
| Year | Once every 64 * 512 * 60 * 60 * 24 * 31 * 12 cycles |

Leap years may be handled in any suitable manner, such as by adjusting the number of days before the month counter increments during a leap year.

Figure 3:
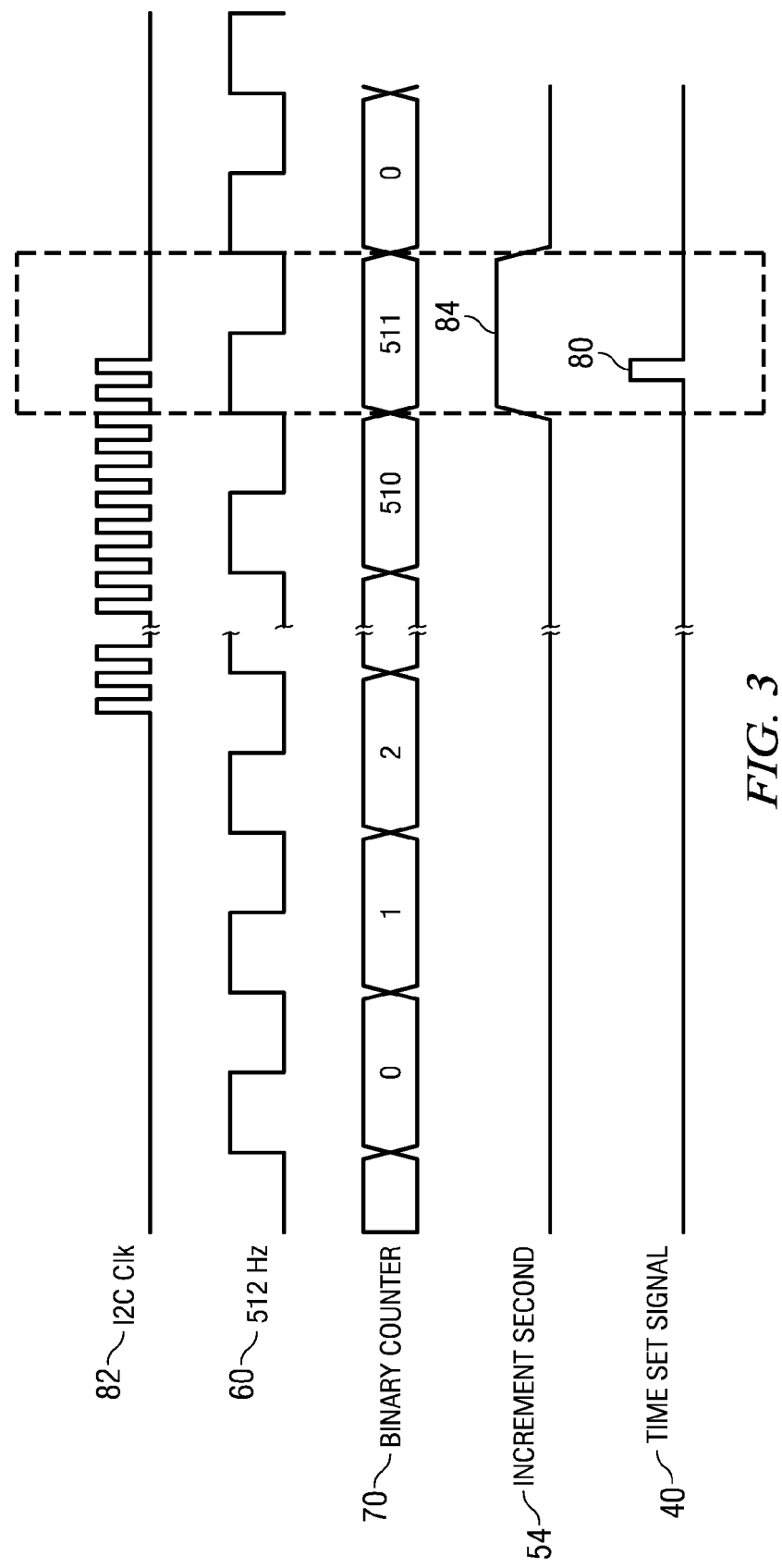
FIG. 3 depicts a timing diagram of signals in a real time clock in accordance with some embodiments.

The clock generation scheme described above is complicated by the need to pulse the time change signal 32 when an external source such as the processor 42 sets the real time clock 10. In one embodiment, an I2C interface is provided for reading and writing the time in the real time clock 10. For example, the time set signal 40 may be asserted when a new value is written to the real time clock 10 using an I2C data bus (not shown) from the processor 42. The I2C interface takes priority over the normal incrementing to maintain time. This is particularly troublesome when the pulse width of the time set signal 40 is narrower than the increment second signal 54 used to increment the counters 44, as illustrated in FIG. 3. In one embodiment, an I2C write pulse 80 on the time set signal 40 is asserted for one cycle of an I2C clock 82 (not shown) connected between the processor 42 and real time clock 10. A pulse 84 on the increment second signal 54 is asserted for one cycle of the 512 Hz clock 60 when the 10-bit counter 70 reaches the terminal count. Given a 400 KHz I2C clock 82, the I2C write pulse 80 is much narrower than the increment second pulse 84. Because the real time clock 10 combines the external clock signal 34 and time set signal 40 into a single time change signal 32 that is used to change the time of the real time clock 10, the time set signal 40 may be missed and the requirement that the time set signal 40 take priority over the external clock signal 34 may be violated. If the time set signal 40 is asserted when the wider increment second signal 54 is already asserted, the time set signal 40 may be totally encompassed within the increment second signal 54. This would cause the real time clock 10 to miss the time set signal 40 and continue incrementing the time rather than setting the shadow registers 50 and counters 44 with a value from the external source 42. (The 400 KHz I2C clock 82 is typically asynchronous to the external clock signal 34 although FIG. 3 does not illustrate this point.)

The clock generator 30 in the real time clock 10 prevents this situation by setting the pulse width of the increment second signal 54 and of the time set signal 40 each to a half cycle of the external clock signal 34. This prevents the time set signal 40 from being encompassed within a wider pulse of the increment second signal 54. In one embodiment with a 400 KHz I2C clock 82 and a 512 Hz clock 60 driving the increment second signal 54, the increment second signal 54 is narrowed using the external clock signal 34, and the time set signal 40 is widened using the external clock signal 34, so that they each have a pulse width of a half cycle of the 32 KHz external clock signal 34. Pulses of the time set signal 40 and of the increment second signal 54 are thus separated so that consecutive pulses of the time set signal 40 and the increment second signal 54 are unique pulses rather than being merged into a single pulse on the time change signal 32. If the time set signal 40 and increment second signal 54 occur simultaneously, that is, within a single cycle of the external clock signal 34, priority is given to the time set signal 40. If the processor 42 provides a time value to the real time clock 10 when the time change signal 32 is asserted, that time value is copied to the shadow registers 50 and counters 44. In other embodiments, the priority of the external clock signal 34 and the time set signal 40 may be handled in any desired manner in the real time clock 10.

Figure 4:
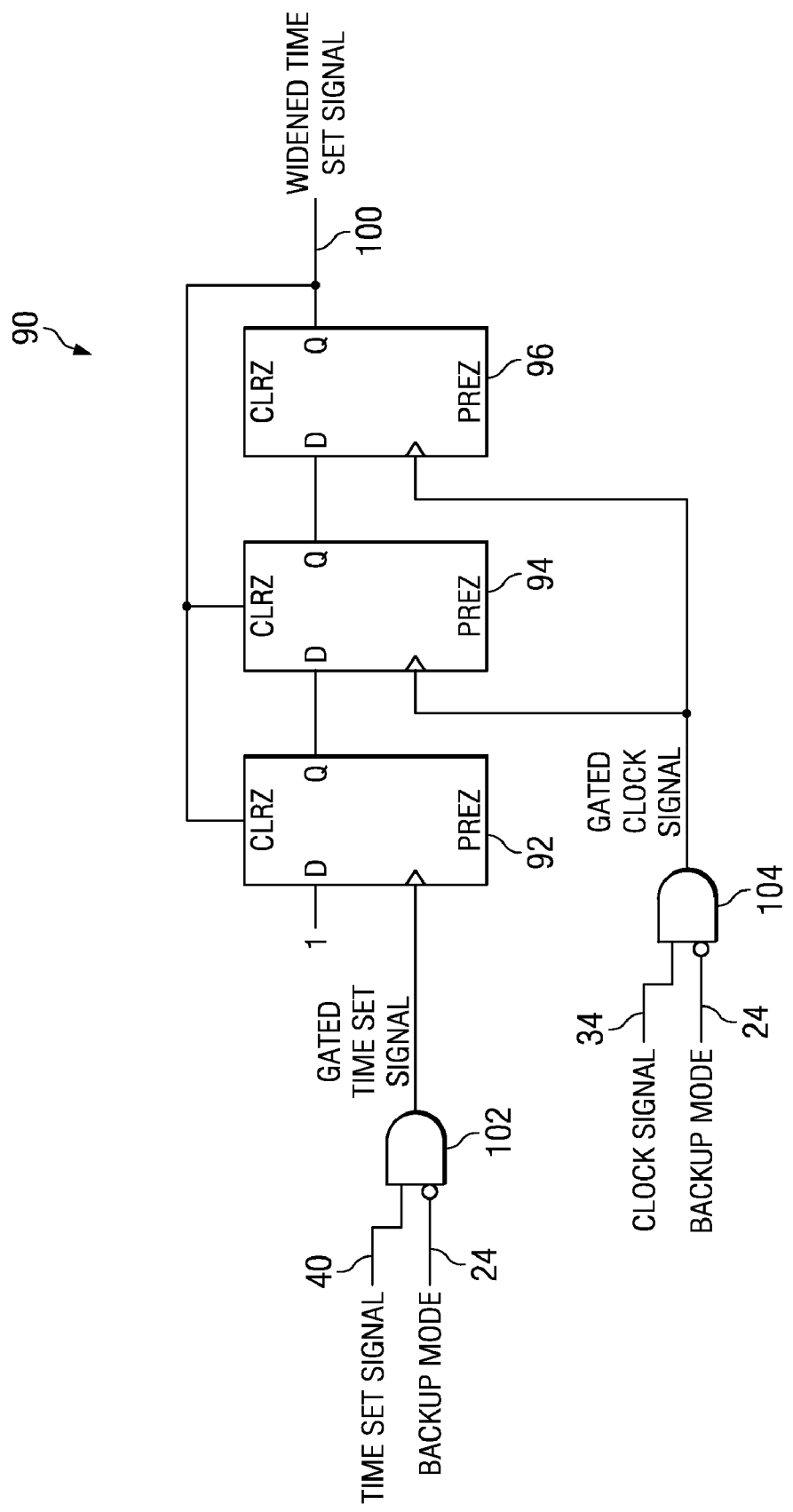
FIG. 4 depicts a pulse widener for a real time clock in accordance with some embodiments.

Turning now to FIG. 4, a pulse widener 90 used to widen the time set signal 40 in the clock generator 30 will be described. The pulse widener 90 stretches pulses on the time set signal 40 to the width of a full cycle of the external clock signal 34. In one embodiment, the time set signal 40 is a 400 KHz data signal and is used to clock a first flip flop 92 in the pulse widener 90. The first flip flop 92 is preset to 1, either by tying the data input high or by grounding the active low PREZ preset input. The data output of the first flip flop 92 is connected to the data input of a second flip flop 94, and the data output of the second flip flop 94 is connected to the data input of a third flip flop 96. The second flip flop 94 and third flip flop 96 are clocked by the 32 KHz external clock signal 34. The output of the third flip flop 96 is a widened time set signal 100. The widened time set signal 100 is connected to the CLRZ clear inputs of the first flip flop 92 and second flip flop 94. When the widened time set signal 100 is asserted, it returns the first flip flop 92 and second flip flop 94 to zero and ends the pulse at the widened time set signal 100 when the next rising edge of the external clock signal 34 reaches the third flip flop 96. Thus, the pulse width of the time set signal 40 is stretched from one cycle of a 400 KHz I2C clock to one cycle of the external clock signal 34.

In one embodiment, the time set signal 40 and external clock signal 34 are gated in the pulse widener 90 to save power when the real time clock 10 is operating in the low power mode. The time set signal 40 and the external clock signal 34 are each gated in an AND gate 102 and 104, respectively, controlled by a backup mode signal 24. As described above, the backup mode signal 24 may be generated in the power supply 14 of the host device 12, or may be generated in the real time clock 10 based on the power applied to the real time clock 10, or in any other desired manner. If the backup mode signal 24 is asserted when the real time clock 10 is operating in low power mode, then the backup mode signal 24 is connected to inverting inputs on the AND gates 102 and 104 in the diagram of FIG. 4. If the backup mode signal 24 is asserted when the real time clock 10 is operating in normal mode, then the backup mode signal 24 would be connected to non-inverting inputs on the AND gates 102 and 104. By gating the time set signal 40 and external clock signal 34, the pulse widener 90 is prevented from switching when the real time clock 10 is in low power mode to conserve power. Again, when the real time clock 10 is in low power mode, the time set signal 40 is typically inactive due to a powered-down host device 12.

With the increment second signal 54 and the widened time set signal 100 now both having a pulse width at least as wide as a cycle of the external clock signal 34, pulse shapers 112 and 114 are used to narrow the pulse widths to half a cycle of the external clock signal 34 in order to separate consecutive pulses on the increment second signal 54 and widened time set signal 100. The increment second signal 54 and widened time set signal 100 are shaped using the external clock signal 34. As in the pulse widener 90, the external clock signal 34 to the pulse shapers 112 and 114 is gated in an AND gate 116 using the backup mode signal 24 to save power during low power operation. The pulse shaper 112 used to shape the widened time set signal 100 has a first flip flop 120 clocked by the gated clock signal 122 and a second flip flop 124 gated by an inverted version of the gated clock signal 122. The widened time set signal 100 is connected to the data inputs of the first flip flop 120 and second flip flop 124. The data output of the first flip flop 120 is connected to an inverting input of an AND gate 126, and the data output of the second flip flop 124 is connected to a non-inverting input of the AND gate 126. (Note that the logic of the pulse shaper 112 may be implemented in any suitable manner, such as using an AND gate with only non-inverting inputs connected to an inverting output of the first flip flop 120.)

A pulse is generated on the shaped time set signal 130 at the output of the AND gate 126 for only a half cycle of the gated clock signal 122 at the beginning or end of the pulse on the widened time set signal 100. Each of the flip flops 120 and 124 produce a pulse at their outputs that is as wide as that on the widened time set signal 100, but offset by a half cycle of the gated clock signal 122 due to the inverted clocking with the gated clock signal 122. The AND gate 126 with one inverted input and one non-inverted input combines the offset pulses from the flip flops 120 and 124 to form a single pulse that is a half cycle of the gated clock signal 122 wide. The pulse on the shaped time set signal 130 will be produced either at the beginning or end of the pulse on the widened time set signal 100 depending on which input of the AND gate 126 is inverted.

The pulse shaper 114 for the increment second signal 54 also has a first flip flop 140 clocked by the gated clock signal 122 and a second flip flop 142 gated by an inverted version of the gated clock signal 122. The increment second signal 54 is connected to the data inputs of the first flip flop 140 and second flip flop 142. The data output of the first flip flop 140 is connected to a non-inverting input of an AND gate 144, and the data output of the second flip flop 142 is connected to an inverting input of the AND gate 144. The pulse shaper 114 produces a pulse on the shaped increment second signal 146 at the output of the AND gate 144 in the same manner as the pulse shaper 112 for the widened time set signal 100. The first and second flip flops 140 and 142 each produce a pulse when the increment second signal 54 pulses, with each offset from the other by a half cycle of the gated clock signal 122. The AND gate 144 combines the two offset pulses to a single pulse that is a half cycle of the gated clock signal 122 wide.

The half cycle wide pulses from the pulse shapers 112 and 114 based on the widened time set signal 100 and the increment second signal 54 are further separated by using opposite logic at the inputs to the AND gate 126 and the AND gate 144 so that the pulse on the shaped time set signal 130 is formed at the beginning of the pulse on the widened time set signal 100 and the pulse on the shaped increment second signal 146 is formed at the end of the pulse on the increment second signal 54, or vice versa. In other words, the first flip flop 120 in the pulse shaper 112 that is clocked by the non-inverted gated clock signal 122 is connected to the inverted input of the AND gate 126, while the first flip flop 140 in the pulse shaper 114 that is clocked by the non-inverted gated clock signal 122 is connected to the non-inverted input of the AND gate 144. Thus, the pulses from the AND gates 126 and 144 will appear at opposite ends of pulses on the widened time set signal 100 and increment second signal 54. In other embodiments, this inversion is not performed so the pulses from the AND gates 126 and 144 will appear at the same ends of pulses on the widened time set signal 100 and increment second signal 54. However, in these embodiments, pulses on the shaped time set signal 130 and shaped increment second signal 146 will still be separated by a half cycle of the gated clock signal 122 unless they are simultaneous. Again, if they are simultaneous, one embodiment of the real time clock 10 is adapted to give priority to the time set signal 40 over the increment second signal 54. The shaped time set signal 130 and the shaped increment second signal 146 are combined in an OR gate 150 to produce a normal operation time change signal 152.

The separation of pulses is illustrated in the timing diagram of FIG. 6. The wider separation produced by generating the shaped time set signal 130 at one end (e.g., the beginning) of the increment second signal 54 and the shaped increment second signal 146 at the opposite end (e.g., the end) of the widened time set signal 100 is not shown in FIG. 6. Rather, to show the timing with a clear scale, FIG. 6 illustrates the closer separation resulting when both signals 130 and 146 are generated at the same end of the increment second signal 54 and widened time set signal 100. A pulse 160 on the shaped increment second signal 146 is as wide as half a cycle 162 of the external clock signal 34, being asserted during the positive half 162 of a cycle of the external clock signal 34. Similarly, a pulse 164 on the shaped time set signal 130 is as wide as half a cycle 166 of the external clock signal 34. In a case 170 where the shaped time set signal 130 pulse occurs before the shaped increment second signal 146 pulse, the normal mode time change signal 152 has two pulses 172 and 174, the first 172 caused by the shaped time set signal 130 and the second 174 caused by the shaped increment second signal 146. The two pulses 172 and 174 are separated by a zero 176 of at least a half cycle of the external clock signal 34.

In the case 180 in which a pulse 182 of the shaped increment second signal 146 arrives at the same time as a pulse 184 of the shaped time set signal 130, a single pulse 186 results on the normal mode time change signal 152. As discussed above, priority is given to the time set signal 40 (and thus to the shaped increment second signal 146) by setting the time in the real time clock 10 based on the external source 42 when the normal mode time change signal 152 pulses if an external time value is available. The determination of whether an external write to the real time clock 10 is taking place may be performed in any suitable manner. Note that if the pulses 182 and 184 of the shaped increment second signal 146 and the shaped time set signal 130 were not widened and shaped as described above, the pulse 182 on the shaped increment second signal 146 would be much wider than the pulse 184 on the shaped time set signal 130. The pulse 184 on the shaped time set signal 130 would be totally encompassed within the pulse 182 on the shaped increment second signal 146 and the write would be ignored.

In the case 190 in which a pulse 192 of the shaped increment second signal 146 arrives before a pulse 194 of the shaped time set signal 130, the normal mode time change signal 152 has two pulses 196 and 200, the first 196 caused by the shaped increment second signal 146 and the second 200 cause by the shaped time set signal 130. Again, the two pulses 196 and 200 are separated by a zero 202 of at least a half cycle of the external clock signal 34. As with case 180, if the pulses 192 and 194 of the shaped increment second signal 146 and the shaped time set signal 130 were not widened and shaped as described above, the pulse 192 on the shaped increment second signal 146 would be much wider than the pulse 194 on the shaped time set signal 130. The pulse 194 would be totally encompassed within the pulse 192 and the write would be ignored.

Figure 5:
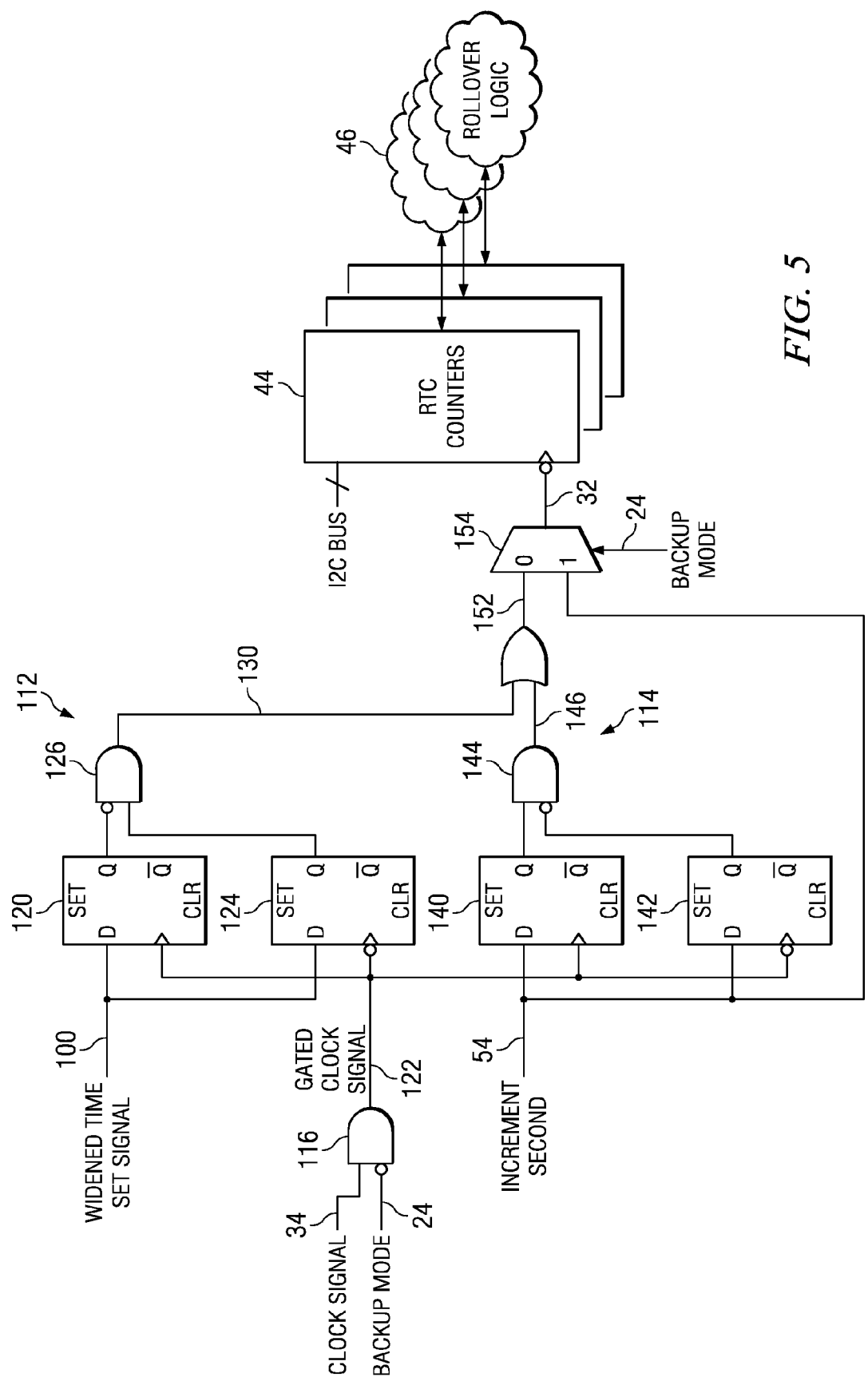
FIG. 5 depicts a pulse shaper and counters for a real time clock in accordance with some embodiments.

Turning back to FIG. 5, the normal mode time change signal 152 and increment second signal 54 are connected to a multiplexer 154 controlled by the backup mode signal 24. The time change signal 32 used to clock the counters 44 is connected either to the normal mode time change signal 152 or to the increment second signal 54. When the real time clock 10 is operating in the normal mode, the backup mode signal 24 causes the multiplexer 154 to select the normal mode time change signal 152, which is based on a combination of the increment second signal 54 and the time set signal 40. When the real time clock 10 is operating in backup mode, the backup mode signal 24 causes the multiplexer 154 to select the increment second signal 54 to clock the counters 44. Furthermore, the gated clocks to the pulse widener 90 and pulse shapers 112 and 114 are turned off, reducing switching in the real time clock 10 and conserving power.

Turning now to FIG. 7, a method of generating a real time clock is summarized. A clock signal 34 is combined with a time set signal 40 to form a time change signal 152 that pulses for each pulse of the time set signal 40 and that has separate pulses for consecutive pulses on the clock signal 34 and the time set signal 40. (Block 220) In other words, the clock generator 30 in the real time clock 10 ensures that each time the time set signal 40 pulses, a corresponding pulse will occur on the normal mode time change signal 152. Pulses due to the time set signal 40 will not be encompassed within and swallowed by pulses due to the external clock signal 34. Consecutive pulses on the external clock signal 34 and time set signal 40 result in separate pulses on the normal mode time change signal 152, rather than merging into one single pulse. The value of the real time clock 10 is changed when the normal mode time change signal 152 is pulsed during normal mode operation. (Block 222)

The real time clock 10 disclosed herein provides a reliable means for tracking time in an electronic device and enables setting the time from an external source, while providing for low power operation when operating from a backup battery or when the external time setting is not needed.

Because all pulses used to clock counters 44 in the real time clock 10 are generated from the same clock source, the resulting time change signal 32 is glitch free.

While illustrative embodiments have been described in detail herein, it is to be understood that the concepts disclosed herein may be otherwise variously embodied and employed.

What is claimed is:

1. A real time clock comprising:
a clock generator having a first input connected to a clock signal, a second input connected to a time set signal, the clock generator producing a time change signal at an output of the clock generator, the clock generator comprising a pulse widener and at least one pulse shaper, wherein the clock generator is adapted to generate a pulse on the time change signal for each pulse of the time set signal, and to generate separate pulses on the time change signal for consecutive pulses on the clock signal and the time set signal; and
a plurality of counters connected to the time change signal, each adapted to track a different unit of time.

2. The real time clock of claim 1, wherein the clock signal is adapted to pulse regularly, and wherein a time value kept by the real time clock is updated when the clock generator pulses the time change signal in response to a pulse on the clock signal.

3. The real time clock of claim 1, wherein the time set signal is adapted to pulse when a time value kept by the real time clock is to be overwritten by a new time value from an external source.

4. The real time clock of claim 1, wherein the real time clock is adapted to operate in a normal mode and in a battery backup mode, and wherein the clock generator is adapted to disregard the time set signal when the real time clock is operating in the battery backup mode.

5. The real time clock of claim 1, wherein the clock generator comprises an input clock divider having an input connected to the clock signal and having an increment second signal at an output.

6. The real time clock of claim 5, wherein the input clock divider comprises a ripple counter having an input connected to the clock signal and a binary counter having an input connected to an output of the ripple counter.

7. The real time clock of claim 5, wherein the pulse widener comprises a data input connected to the time set signal and a clock input connected to the clock signal, wherein the pulse widener is adapted to produce a widened time set signal having a pulse width that remains asserted for one cycle of the clock signal.

8. The real time clock of claim 7, wherein a clock signal to the pulse widener is gated in an AND gate, the AND gate having a non-inverted input connected to the clock signal and an inverted input connected to a battery backup mode signal, a gated clock for use in the pulse widener appearing at an output of the AND gate.

9. The real time clock of claim 7, wherein the pulse widener comprises:
a first flip flop having a clock input connected to the time set signal;

a second flip flop having a clock input connected to the clock signal and a data input connected to an output of the first flip flop; and a third flip flop having a clock input connected to the clock signal and a data input connected to an output of the second flip flop, wherein the widened time set signal appears at an output of the third flip flop and is connected to a clear input of the first flip flop and a clear input of the second flip flop.

10. The real time clock of claim 7, wherein the at least one pulse shaper comprises a first pulse shaper and a second pulse shaper;

wherein the first pulse shaper is connected to the increment second signal and has an output with a pulse width that remains asserted for one half cycle of the clock signal;

wherein the second pulse shaper is connected to the widened time set signal and has an output with a pulse width that remains asserted for one half cycle of the clock signal; and wherein the clock generator further comprises an OR gate having a first input connected to the output of the first pulse shaper, a second input connected to the output of the second pulse shaper, and an output carrying the time change signal.

11. The real time clock of claim 10, wherein the first pulse shaper comprises:

a first flip flop having a data input connected to the increment second signal, and a clock input connected to the clock signal;

a second flip flop having a data input connected to the increment second signal, and a clock input connected to an inverted version of the clock signal; and an AND gate having an inverted input connected to an output of the first flip flop and a non-inverted input connected to an output of the second flip flop, wherein the output of the first pulse shaper appears at an output of the AND gate.

12. The real time clock of claim 10, wherein the second pulse shaper comprises:

a first flip flop having a data input connected to the widened time set signal, and a clock input connected to the clock signal;

a second flip flop having a data input connected to the widened time set signal, and a clock input connected to an inverted version of the clock signal; and an AND gate having an inverted input connected to an output of the first flip flop and a non-inverted input connected to an output of the second flip flop, wherein the output of the second pulse shaper appears at an output of the AND gate.

13. The real time clock of claim 10, wherein a clock signal to the first pulse shaper and the second pulse shaper is gated in an AND gate, the AND gate having a non-inverted input connected to the clock signal and an inverted input connected to a battery backup mode signal, a gated clock for use in the first pulse shaper and the second pulse shaper appearing at an output of the AND gate.

14. The real time clock of claim 10, further comprising a multiplexer having a first input connected to the time change signal and a second input connected to the increment second signal, wherein the multiplexer selects the time change signal when the real time clock is operating in a normal mode and the increment second signal when the real time clock is operating in a battery backup mode, and wherein the plurality of counters are connected to an output of the multiplexer.

15. A method of generating a real time clock, the method comprising:

combining a clock signal with a time set signal to form a time change signal that pulses for each pulse of the time set signal and that has separate pulses for consecutive pulses on the clock signal and the time set signal; and changing a value of the real time clock when the time change signal is pulsed.

16. The method of claim 15, further comprising dividing the clock signal to form an increment second signal and increasing a pulse width of the time set signal such that the time set signal has a pulse width that remains asserted for one cycle of the clock signal, wherein the time change signal is based on the increment second signal and the time set signal.

17. The method of claim 16, further comprising narrowing a pulse width of the increment second signal and of the time set signal such that the increment second signal and the time set signal each have a pulse width that remains asserted for one half cycle of the clock signal.

18. The method of claim 15, further comprising disregarding the time set signal when operating in a battery backup mode.

19. The method of claim 18, further comprising disabling clocks used when combining the clock signal with the time set signal to form the time change signal when operating in the battery backup mode.

20. An electronic device comprising:

a battery;

a power supply;

a real time clock connected to the battery and the power supply, wherein the real time clock is adapted to operate using the battery when the power supply is turned off, the real time clock comprising:

a clock generator having a first input connected to a clock signal, a second input connected to a time set signal, the clock generator producing a time change signal at an output of the clock generator, wherein the clock generator is adapted to generate a pulse on the time change signal for each pulse of the time set signal, and to generate separate pulses on the time change signal for consecutive pulses on the clock signal and the time set signal, the clock generator comprising:

an input clock divider having an input connected to the clock signal and having an increment second signal at an output, the input clock divider comprising a ripple counter having an input connected to the clock signal and a binary counter having an input connected to an output of the ripple counter;

a pulse widener comprising:

an AND gate having a non-inverted input connected to the clock signal and an inverted input connected to a battery backup mode signal;

a first flip flop having a clock input connected to the time set signal;

a second flip flop having a clock input connected to an output of the AND gate, and a data input connected to an output of the first flip flop; and a third flip flop having a clock input connected to the clock signal, and a data input connected to an output of the second flip flop, wherein a widened time set signal appears at an output of the third flip flop and is connected to a clear input of the first flip flop and a clear input of the second flip flop, and wherein the widened time set signal has a pulse width that remains asserted for one cycle of the clock signal;

a first pulse shaper comprising:
   a second AND gate having a non-inverted input connected to the clock signal and an
   inverted input connected to the battery backup mode signal;
   a fourth flip flop having a data input connected to the increment second signal, and a clock input connected to an output of the second AND gate;
   a fifth flip flop having a data input connected to the increment second signal, and a clock input connected to an inverted version of the output of the second AND gate; and
   an third AND gate having an inverted input connected to an output of the fourth flip flop and a non-inverted input connected to an output of the fifth flip flop, wherein an output of the first pulse shaper appears at an output of the third AND gate, wherein the output of the first pulse shaper has a pulse width that remains asserted for one half cycle of the clock signal;
a second pulse shaper comprising:
   a fourth AND gate having a non-inverted input connected to the clock signal and an
   inverted input connected to the battery backup mode signal;
   a sixth flip flop having a data input connected to the widened time set signal, and a clock input connected to an output of the fourth AND gate;
   a seventh flip flop having a data input connected to the widened time set signal, and a clock input connected to an inverted version of the output of the fourth AND gate; and
   an fifth AND gate having an inverted input connected to an output of the sixth flip flop and a non-inverted input connected to an output of the seventh flip flop, wherein an output of the second pulse shaper appears at an output of the fifth AND gate, wherein the output of the second pulse shaper has a pulse width that remains asserted for one half cycle of the clock signal; and
a multiplexer having a first input connected to the time change signal and a second input connected to the increment second signal, wherein the multiplexer selects the time change signal when the real time clock is operating in a normal mode and the increment second signal when the real time clock is operating in a battery backup mode; and
a plurality of counters connected to an output of the multiplexer, each adapted to track a different unit of time.

\* \* \* \* \*